US011927316B2

(12) United States Patent
Ragan et al.

(10) Patent No.: US 11,927,316 B2
(45) Date of Patent: Mar. 12, 2024

(54) SIGN POST FLASHER ASSEMBLY

(71) Applicant: TraffiCalm Systems, LLC, Post Falls, ID (US)

(72) Inventors: John Lloyd Ragan, Hayden, ID (US); Daniel W. Skites, Coeur d' Alene, ID (US); Charles Withey Perry, II, Post Falls, ID (US)

(73) Assignee: TRAFFICALM SYSTEMS, LLC, Post Falls, ID (US)

( * ) Notice: Subject to any disclaimer, the term of this patent is extended or adjusted under 35 U.S.C. 154(b) by 0 days.

(21) Appl. No.: 17/443,225

(22) Filed: Jul. 22, 2021

(65) Prior Publication Data

US 2022/0026035 A1 Jan. 27, 2022

Related U.S. Application Data

(60) Provisional application No. 63/055,213, filed on Jul. 22, 2020.

(51) Int. Cl.

| | |
|---|---|
| ***G09F 13/22*** | (2006.01) |
| ***F21S 4/28*** | (2016.01) |
| ***F21S 8/08*** | (2006.01) |
| ***F21S 10/06*** | (2006.01) |
| ***F21V 7/04*** | (2006.01) |

(Continued)

(52) U.S. Cl.

CPC ................. *F21S 10/06* (2013.01); *F21S 4/28* (2016.01); *F21S 8/083* (2013.01); *F21V 7/04* (2013.01); *F21V 21/116* (2013.01); *F21V 23/003* (2013.01); *F21V 23/06* (2013.01); *F21V 31/005* (2013.01); *G09F 13/22* (2013.01); *F21Y 2115/10* (2016.08); *G09F 7/18* (2013.01); *G09F 2013/222* (2013.01)

(58) Field of Classification Search

CPC ... F21S 10/06; F21S 4/28; F21S 8/083; F21V 7/04; F21V 21/116; F21V 23/003; F21V 23/06; F21V 31/005; G09F 13/22; G09F 7/18; G09F 2013/222; G09F 13/0472; G09F 13/18; G09F 13/005; F21Y 2115/10; E01F 9/615; G08G 1/095

See application file for complete search history.

(56) References Cited

U.S. PATENT DOCUMENTS 5,819,455 A * 10/1998 Tsuda ........................ G09F 9/33 40/550
6,107,941 A * 8/2000 Jones ................... G08G 1/0955 340/471

(Continued)

*Primary Examiner* — Tsion Tumebo
(74) *Attorney, Agent, or Firm* — SCHWEGMAN LUNDBERG & WOESSNER, P.A.

(57) ABSTRACT

Various examples are directed to apparatus and methods for providing a sign post flasher assembly. An apparatus includes an elongated assembly having one or more channels, and one or more light sources configured to be placed within the one or more channels. The apparatus also includes an electrically conductive material configured to electrically connect the one or more light sources, and a covering material configured to cover the electrically conductive material to provide a waterproof seal. The elongated assembly is configured to be affixed to and align with a front of a sign post along a length of the sign post, and the electrically conductive material is configured to be connected to a controller to control flashing of the one or more light sources.

20 Claims, 9 Drawing Sheets

(51) Int. Cl.

| | |
|---|---|
| ***F21V 21/116*** | (2006.01) |
| ***F21V 23/00*** | (2015.01) |
| ***F21V 23/06*** | (2006.01) |
| ***F21V 31/00*** | (2006.01) |
| ***F21Y 115/10*** | (2016.01) |
| ***G09F 7/18*** | (2006.01) |

(56) References Cited

U.S. PATENT DOCUMENTS

| | | | | |
|---|---|---|---|---|
| 6,198,410 | B1 * | 3/2001 | White | G09F 13/26 340/919 |
| 6,204,777 | B1 * | 3/2001 | Lyons | G09F 9/33 40/586 |
| 7,347,597 | B2 | 3/2008 | French | |
| 7,497,040 | B2 * | 3/2009 | Chambless | G09F 21/02 40/550 |
| 8,098,172 | B2 * | 1/2012 | Graham | G08B 5/006 40/586 |
| 8,458,938 | B2 * | 6/2013 | Tucker | G09F 27/007 40/607.1 |
| 8,702,265 | B2 | 4/2014 | May | |
| 9,153,149 | B1 * | 10/2015 | Curtiss | E01F 9/617 |
| 9,159,252 | B2 * | 10/2015 | Cai | E01F 9/615 |
| 9,286,815 | B1 * | 3/2016 | Smith | G09F 15/0056 |
| 9,659,493 | B2 * | 5/2017 | Jones | F21S 9/035 |
| 9,920,917 | B1 * | 3/2018 | Isik | G09F 13/18 |
| 10,445,992 | B2 | 10/2019 | Cummings et al. | |
| 10,650,672 | B2 * | 5/2020 | Shuff | G08G 1/005 |
| 10,867,533 | B2 * | 12/2020 | Laforce | G09F 13/005 |
| 11,024,204 | B2 * | 6/2021 | General | H04N 23/57 |
| 11,276,336 | B2 * | 3/2022 | Schmidling | G09F 13/22 |
| 2006/0061487 | A1 * | 3/2006 | Heap | G09F 13/22 340/908 |
| 2016/0063904 | A1 * | 3/2016 | Heath | B60Q 1/2657 362/545 |
| 2017/0082280 | A1 | 3/2017 | Reiser | |
| 2017/0278438 | A1 * | 9/2017 | Kuo | G09F 13/0413 |
| 2017/0301268 | A1 * | 10/2017 | Laforce | G09F 9/302 |
| 2017/0323591 | A1 * | 11/2017 | Siminoff | G09F 13/005 |
| 2018/0033259 | A1 * | 2/2018 | Cummings | G08G 1/0955 |
| 2019/0043352 | A1 * | 2/2019 | Baek | F24S 25/10 |
| 2019/0096294 | A1 * | 3/2019 | Yoshioka | G09F 13/0413 |
| 2020/0005634 | A1 * | 1/2020 | Shuff | G08G 1/095 |

* cited by examiner

SIGN POST FLASHER ASSEMBLY

PRIORITY APPLICATION

This application claims the benefit of U.S. Provisional Application Ser. No. 63/055,213, filed Jul. 22, 2020, the disclosure of which is incorporated herein in its entirety by reference.

TECHNICAL FIELD

Embodiments described herein generally relate to warning and traffic sign enhancement and, for example and without limitation, to apparatus, systems and methods for a sign post flasher assembly.

BACKGROUND

Warning and traffic signs protect individuals by warning of dangerous situations and regulating traffic to prevent collisions and other accidents. The effectiveness of warning and traffic signs may be increased by increasing visibility and drawing attention to the warning and traffic signs.

SUMMARY

Disclosed herein, among other things, are apparatus and methods for providing a sign post flasher assembly. One aspect of the present subject matter includes an apparatus including an elongated assembly having one or more channels, and one or more light sources configured to be placed within the one or more channels. The apparatus also includes an electrically conductive material configured to electrically connect the one or more light sources, and a covering material configured to cover the electrically conductive material to provide a waterproof seal. The elongated assembly is configured to be affixed to and align with a front of a sign post along a length of the sign post, and the electrically conductive material is configured to be connected to a controller to control flashing of the one or more light sources.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

Some embodiments are illustrated by way of example, and not of limitation, in the figures of the accompanying drawings, which are not necessarily drawn to scale, in which.

DETAILED DESCRIPTION

Figure 1A:
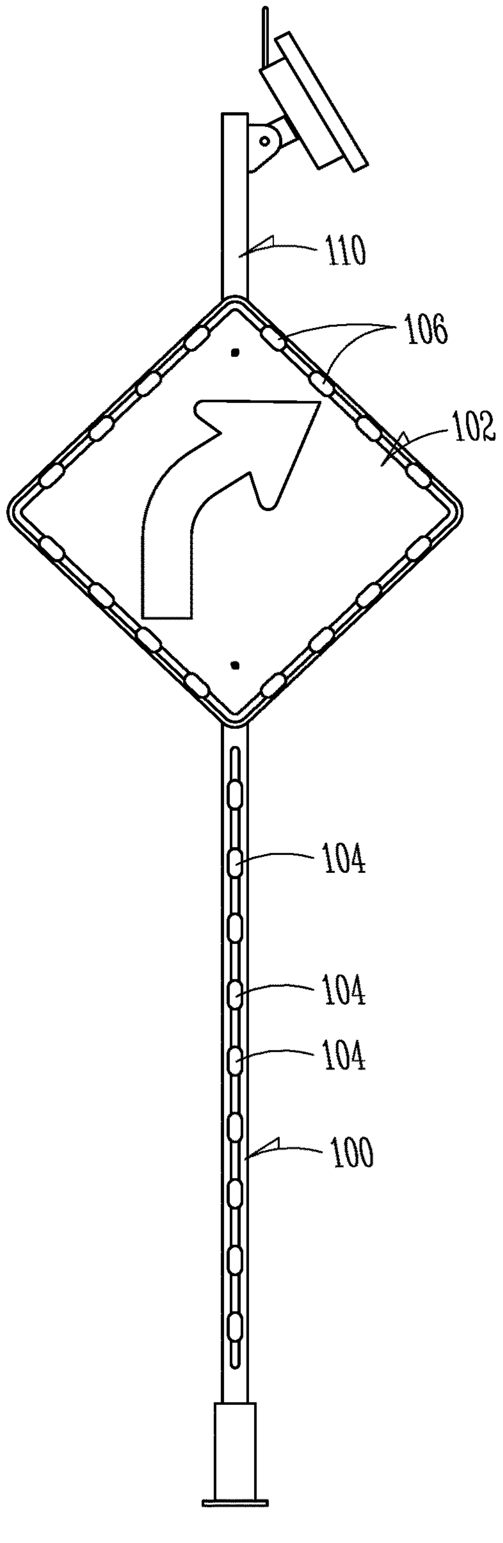
FIGS. 1A-1C illustrate example embodiments of a sign post flasher assembly affixed to various sign posts.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Warning and traffic signs protect individuals by warning of dangerous situations and regulating traffic to prevent collisions and other accidents. The effectiveness of warning and traffic signs may be increased by increasing visibility and drawing attention to the warning and traffic signs.

The present subject matter provides an apparatus configured to attach to the face of a sign post for a warning or traffic sign, to provide an additional flashing light source to increase visibility of the sign and sign post. The apparatus of the present subject matter increases sign visibility day and night, offering greater visibility to the post and sign, especially in inclement weather or to distracted or under the influence drivers.

In one embodiment, the apparatus of the present subject matter includes flashing light emitting diodes (LEDs) that attach to the face of a traffic sign post along a length of the sign post in a vertical orientation. The apparatus has a width similar to the width of the sign post and a length that is less than or equal to the length of the sign post exposed above or below (or both above and below) the sign, in various embodiments. The apparatus can be attached to any sign post type, including but not limited to wood posts, metal posts, round posts, square tube posts, or U-channel posts. In various embodiments, the LEDs are controlled by a controller or processor either included with, or external to, the apparatus. The LEDs of the present apparatus can be flashed with an existing LED-enhanced sign or by themselves, either in unison or wigwagging (alternating), in various embodiments. The apparatus can be daisy-chained to the existing LED-enhanced sign, in an embodiment. Various lengths and widths can be used for this apparatus, according to the desired application. In various embodiments, the LEDs of the present apparatus can be flashed sequentially in either direction or in unison. Various colors of light sources, such as LEDs, can be used for the present apparatus, including but not limited to red, yellow, amber, white, green or high intensity versions of any color. The LEDs can be used with or without retroreflective sheeting, in various embodiments. The LEDs can be placed in the apparatus in a pattern designed to attract attention, such as three in a row with a space between the next three, or four in a row with a space between the next four, in various embodiments.

In one embodiment, the present apparatus in configured to be attached to a sign post through attachment apertures using hardware, such as anti-theft hardware. Any single LED failure does not affect other LED operation in the apparatus, in various embodiments. In various embodiments, the present apparatus is hermetically sealed and able to operate completely underwater for an extended period of time. Various types of signs and sign posts can be augmented with the apparatus of the present subject matter, including but not limited to stop signs, yield signs, crosswalk signs, railroad crossing signs, warning signs, highway guide signs, wrong way signs, do not enter signs or speed limit signs. In some embodiments, the apparatus has a rigid construction. In other embodiments, the apparatus has a flexible construction. In some embodiments, the apparatus includes a removable cover over a portion or all of the length of the apparatus.

Various embodiments of the present subject matter provide a light bar with an electrical connector that can connect to other lighting on the sign, to allow for coordinated blinking of the lights. In various embodiments, a light bar is provided with a series of LED lights recessed in a channel of a bar that protects the lights from impact and protects the electrical wiring and lights from moisture and temperature extremes. The recessed nature of the lights provides for illumination at a limited range of angles about the light bar, such that the lights are mainly visible from the front of the channel of the light bar and are not a distraction to traffic that approaches from the back side of the light bar and from the left and right sides of the light bar, in various embodiments. Various embodiments include a light bar with potting material in the channel of the bar which makes the device waterproof. The light bar is lightweight and can be attached with a variety of different attachment mechanisms, in various embodiments. Various embodiments provide an LED light set mounted in the light bar to provide high luminosity using relatively low power.

Figure 1B:
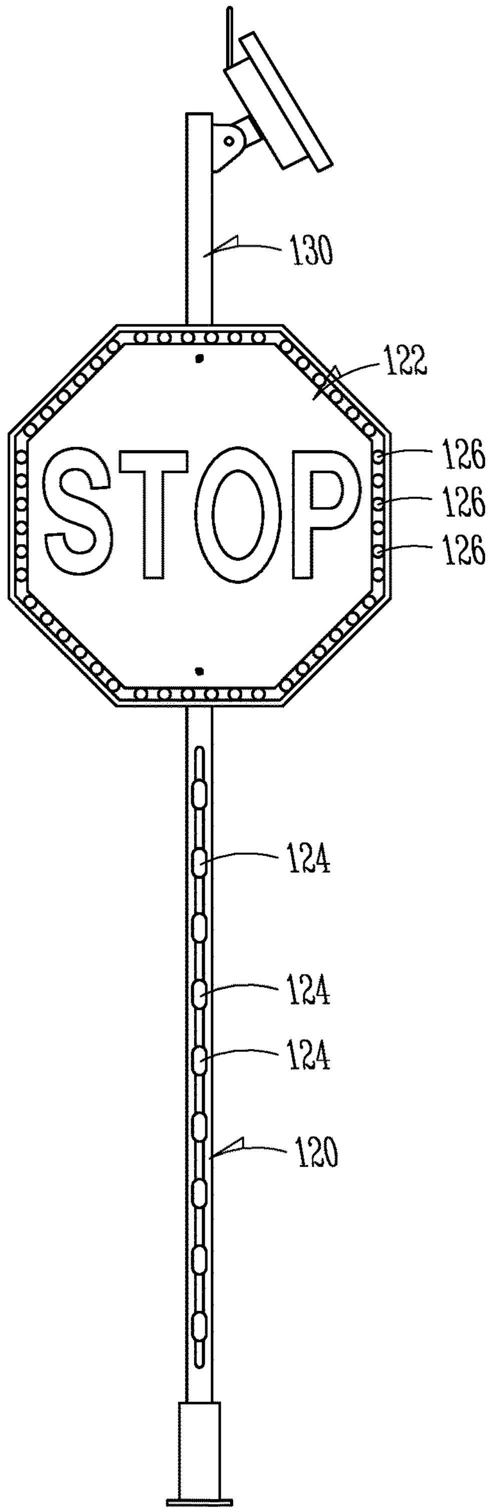
Figure 1C:
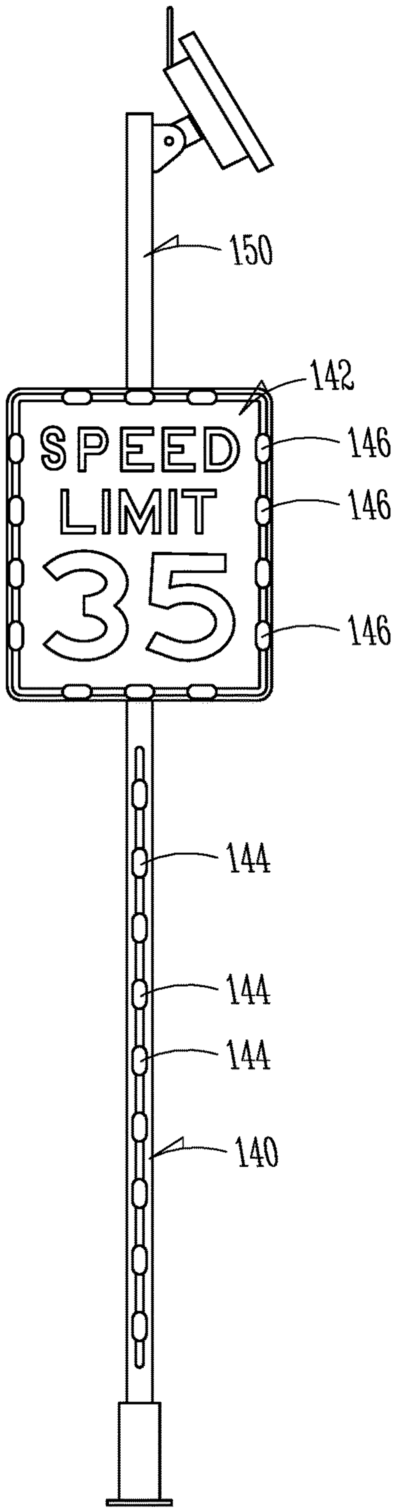

FIGS. 1A-1C illustrate example embodiments of a sign post flasher assembly affixed to various sign posts. FIG. 1A illustrates a traffic road curve sign 102 including an apparatus 100 of the present subject matter having amber LEDs 104 that is attached to the front of the sign post 110 along a length of the sign post below the sign 102. FIG. 1B illustrates a traffic stop sign 122 including an apparatus 120 of the present subject matter having red LEDs 124 that is attached to the front of the sign post 130 along a length of the sign post below the sign 122. FIG. 1C illustrates a traffic speed limit sign 142 including an apparatus 140 of the present subject matter having white LEDs 144 that is attached to the front of the sign post 150 along a length of the sign post below the sign 142. The depicted embodiments can coordinate flashing with an additional LED light source 106, 126, 146 on the perimeter of the sign.

Figure 2A:
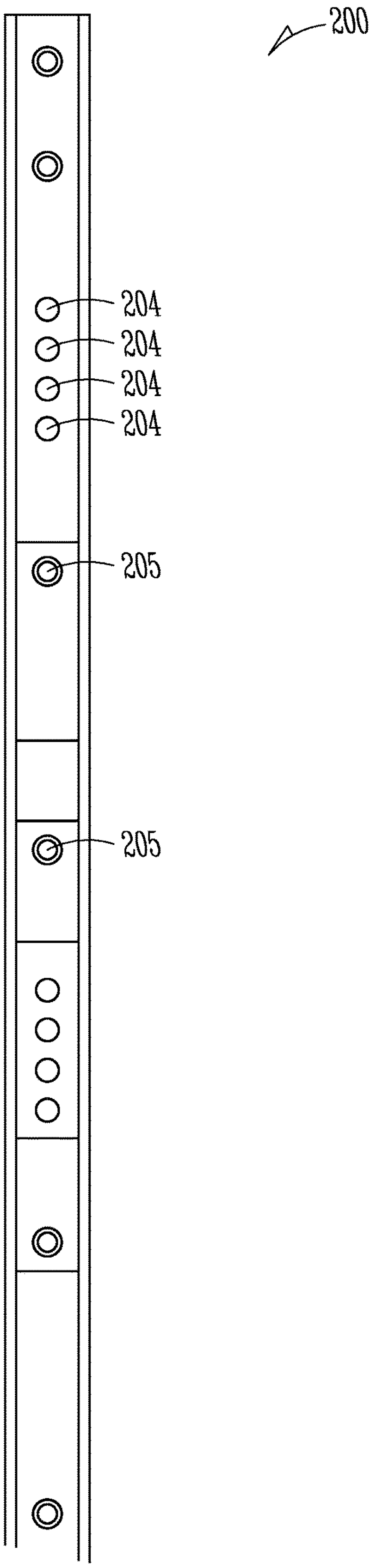
FIGS. 2A-2D illustrate example embodiments of sign post flasher assemblies.
Figure 2B:
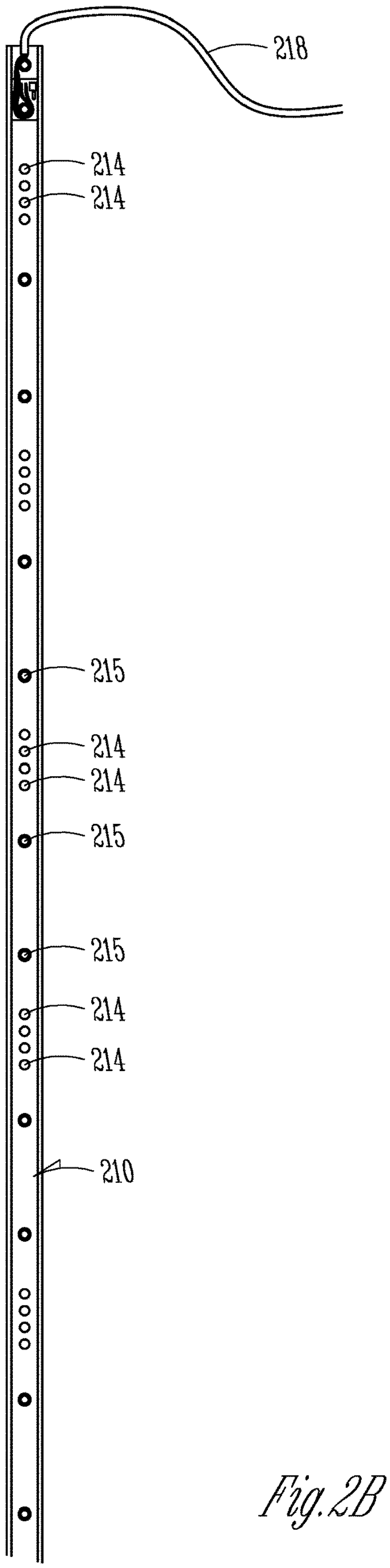
Figure 2C:
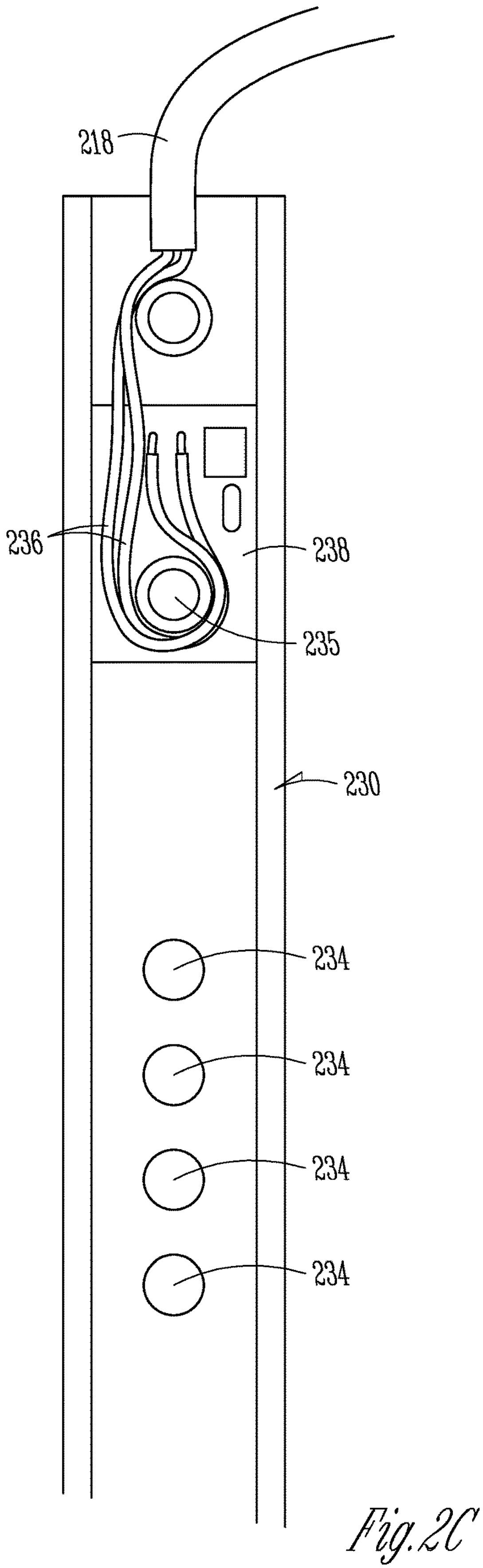
Figure 2D:
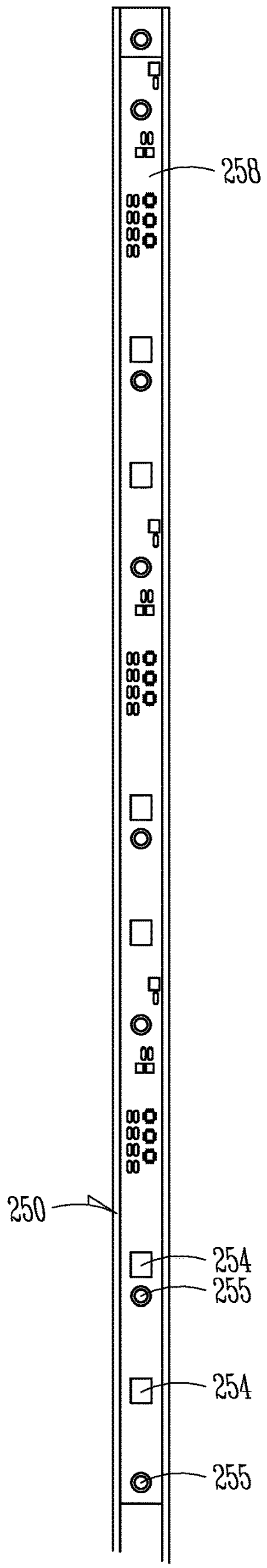

FIGS. 2A-2D illustrate example embodiments of sign post flasher assemblies. FIG. 2A illustrates a top view of an apparatus 200 of the present subject matter without a removable cover, showing the LEDs 204 (in one embodiment red LEDs) and attachment apertures 205. FIG. 2B illustrates a further view of an embodiment of the apparatus 210 of the present subject matter without a removable cover, showing the LEDs 214 (in one embodiment red LEDs), attachment apertures 215, and a pigtail 218 extending from an end of the apparatus for making one or more electrical connections. FIG. 2C illustrates a further view of an embodiment of the apparatus 230 of the present subject matter without a removable cover and with some potting material removed, showing the LEDs 234 (in one embodiment red LEDs), attachment apertures 235, electrical wires 236 and a circuit board 238 for making one or more electrical connections. FIG. 2D illustrates a further view of an embodiment of the apparatus 250 of the present subject matter before adding potting material, showing the LEDs 254 (in one embodiment red LEDs), attachment apertures 255 and a circuit board 258 for making one or more electrical connections. Other LED types and colors may be used without departing from the scope of the present subject matter.

Figure 3A:
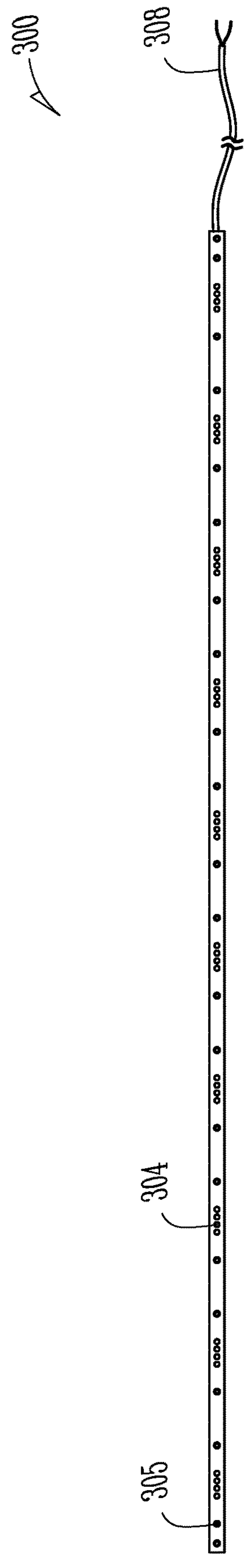
FIGS. 3A-3C illustrate schematic diagrams of example embodiments of sign post flasher assemblies.
Figure 3B:
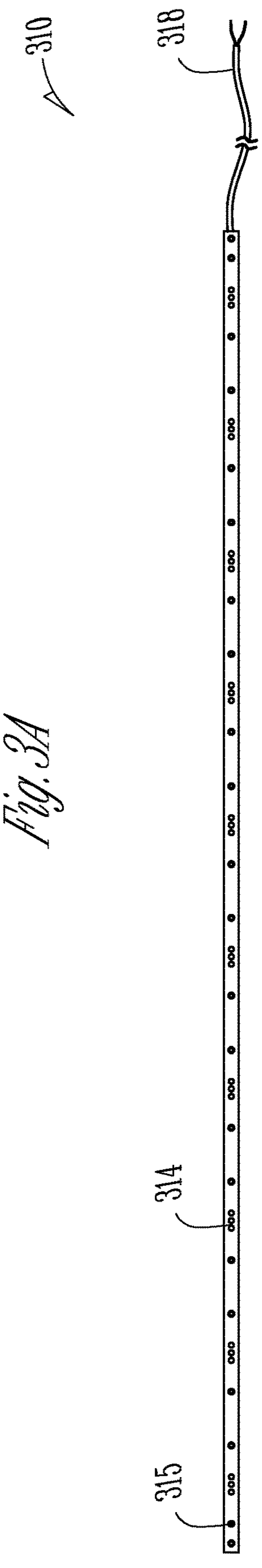
Figure 3C:
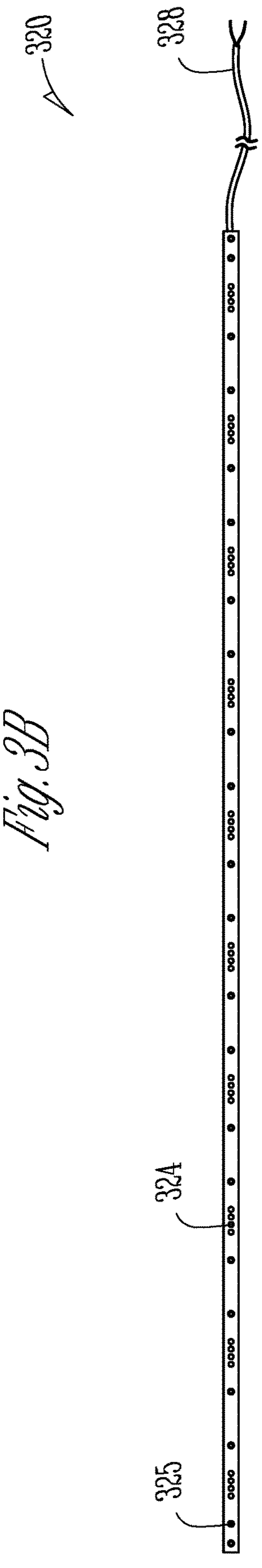

FIGS. 3A-3C illustrate schematic diagrams of example embodiments of sign post flasher assemblies. FIG. 3A illustrates a schematic diagram of an embodiment of the apparatus 300 of the present subject matter, showing spacing of red LEDs 304 and attachment apertures 305, and showing a pigtail 308 extending from an end of the apparatus for making one or more electrical connections. FIG. 3B illustrates a schematic diagram of an embodiment of the apparatus 310 of the present subject matter, showing spacing of white LEDs 314 and attachment apertures 315, and showing a pigtail 318 extending from an end of the apparatus for making one or more electrical connections. FIG. 3C illustrates a schematic diagram of an embodiment of the apparatus 320 of the present subject matter, showing spacing of amber LEDs 324 and attachment apertures 325, and showing a pigtail 328 extending from an end of the apparatus for making one or more electrical connections. Other spacings of LEDs and apertures may be used without departing from the scope of the present subject matter.

One aspect of the present subject matter includes an apparatus including an elongated assembly having one or more channels, and one or more light sources configured to be placed within the one or more channels. The apparatus also includes an electrically conductive material configured to electrically connect the one or more light sources, and a covering material configured to cover the electrically conductive material to provide a waterproof seal. The elongated assembly is configured to be affixed to and align with a front of a sign post along a length of the sign post, and the electrically conductive material is configured to be connected to a controller to control flashing of the one or more light sources.

In various embodiments, a first dimension of the elongated assembly is approximately equal to a width of a front surface of the sign post. The one or more light sources include light emitting diodes (LEDs), in various embodiments. Other types of light sources (in addition to or instead of LEDs) can be used without departing from the scope of the present subject matter. In some embodiments, the LEDs include a prismatic or retroreflective sheeting. The LEDs include one or more of red, yellow or white LEDs, in various embodiments. According to various embodiments, a single LED failure does not affect functioning of other LEDs. The controller is configured to control flashing of the LEDs in unison, in an alternating pattern, or in a sequential pattern, in various embodiments. In various embodiments, the controller is configured to control flashing of the LEDs in coordination with flashing of an additional light source separately affixed to the sign post or separately affixed to a sign connected to the sign post. The controller is configured to control flashing of the LEDs in unison or alternating with the flashing of the additional light source, in various embodiments. The waterproof seal includes a hermetical seal, in various embodiments. The sign post may comprise wood or metal, and may include a post, a U-channel, a square tube, or a round tube, in various embodiments. The elongated assembly is configured to be affixed to the front of the sign post using anti-theft hardware, in some embodiments. In one embodiment, the electrically conductive material is configured to be connected to the controller using a pigtail connector. The covering material includes a potting material, in various embodiments. In various embodiments, the electrically conductive material includes one or more of an electrical wire or a circuit board. The sign post is attached to one or more of a stop sign, a yield sign, a crosswalk sign, a railroad crossing sign, a warning sign, a highway guide sign, a wrong way sign, a do not enter sign, or a speed limit sign, in various embodiments.

Figure 4:
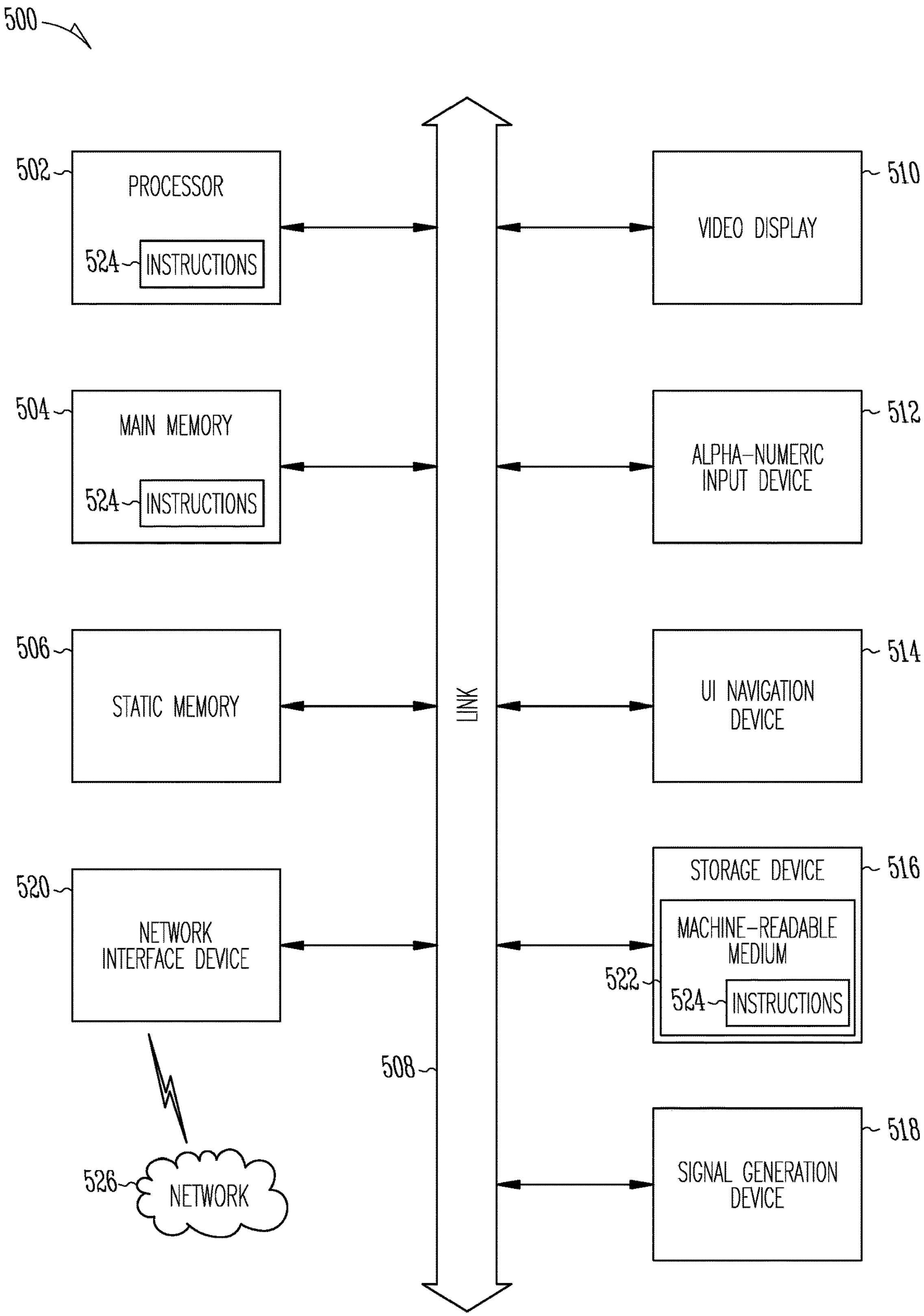
FIG. 4 is a block diagram of a machine in the example form of a computer system within which a set of instructions may be executed, for causing the machine to perform any one or more of the methodologies discussed herein.

FIG. 4 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile or cellular telephone such as a smart phone, a wearable device such as a smart watch, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The data storage device 516 includes a machine-readable medium 522 on which is stored one or more sets of data structures and instructions 524 (e.g., software) embodying or utilized by any one or more of the methodologies or functions described herein. The instructions 524 may include a machine learning system or algorithm, and may also reside, completely or at least partially, within the main memory 504, static memory 506, and/or within the processor 502 during execution thereof by the computer system 500, with the main memory 504, static memory 506, and the processor 502 also constituting machine-readable media.

While the non-transitory computer-readable storage medium 522 is illustrated in an example embodiment to be a single medium, the term "machine-readable medium" or "computer-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions (e.g., instructions 524) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone system (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. An apparatus for a post of a sign, the apparatus comprising:

an elongated rectangular assembly having one or more channels;

one or more light sources configured to be placed within the one or more channels;

an electrically conductive material configured to electrically connect the one or more light sources; and a covering material configured to cover the electrically conductive material to provide a waterproof seal, wherein the elongated assembly is configured to be affixed to and align with a front of the post of the sign along a length of the post below the sign, and wherein the electrically conductive material is configured to be connected to a controller to control flashing of the one or more light sources.

2. The apparatus of claim 1, wherein a first dimension of the elongated assembly is approximately equal to a width of a front surface of the post.

3. The apparatus of claim 1, wherein the one or more light sources include light emitting diodes (LEDs).

4. The apparatus of claim 3, wherein the LEDs include a retroreflective sheeting.

5. The apparatus of claim 3, wherein the LEDs include one or more of red, yellow, green or white LEDs.

6. The apparatus of claim 3, wherein a single LED failure does not affect functioning of other LEDs.

7. The apparatus of claim 3, wherein the controller is configured to control flashing of the LEDs in unison.

8. The apparatus of claim 3, wherein the controller is configured to control flashing of the LEDs in an alternating pattern.

9. The apparatus of claim 3, wherein the controller is configured to control flashing of the LEDs in a sequential pattern.

10. The apparatus of claim 3, wherein the controller is configured to control flashing of the LEDs in coordination with flashing of an additional light source separately affixed to the post or separately affixed to the sign connected to the post.

11. The apparatus of claim 10, wherein the controller is configured to control flashing of the LEDs in unison with the flashing of the additional light source.

12. The apparatus of claim 10, wherein the controller is configured to control flashing of the LEDs alternating with the flashing of the additional light source.

13. The apparatus of claim 1, wherein the waterproof seal includes a hermetical seal.

14. The apparatus of claim 1, wherein the post comprises wood or metal.

15. The apparatus of claim 1, wherein the post includes a U-channel, a square tube, or a round tube.

16. The apparatus of claim 1, wherein the elongated assembly is configured to be affixed to the front of the post using anti-theft hardware.

17. The apparatus of claim 1, wherein the electrically conductive material is configured to be connected to the controller using a pigtail connector.

18. The apparatus of claim 1, wherein the covering material includes a potting material.

19. The apparatus of claim 1, wherein the electrically conductive material includes one or more of an electrical wire or a circuit board.

20. The apparatus of claim 1, wherein the sign includes one or more of a stop sign, a yield sign, a crosswalk sign, a railroad crossing sign, a warning sign, a highway guide sign, a wrong way sign, a do not enter sign, or a speed limit sign.

* * * * *